US011037335B2

United States Patent
Lee et al.

(10) Patent No.: US 11,037,335 B2
(45) Date of Patent: Jun. 15, 2021

(54) DEEP LEARNING BASED VIRTUAL HAIR DYEING METHOD AND METHOD FOR PROVIDING VIRTUAL HAIR DYEING SERVICE USING THE SAME

(71) Applicant: NHN Corporation, Gyeonggi-do (KR)

(72) Inventors: Rokkyu Lee, Gyeonggi-do (KR); Minseok Kang, Gyeonggi-do (KR); Gi Hyeok Pak, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/703,639

(22) Filed: Dec. 4, 2019

(65) Prior Publication Data
US 2020/0175729 A1    Jun. 4, 2020

(30) Foreign Application Priority Data
Dec. 4, 2018 (KR) .................. 10-2018-0154223

(51) Int. Cl.
*G06T 7/194* (2017.01)
*G06T 11/00* (2006.01)
(Continued)

(52) U.S. Cl.
CPC .......... *G06T 11/001* (2013.01); *G06N 3/0454* (2013.01); *G06N 3/088* (2013.01);
(Continued)

(58) Field of Classification Search
CPC ......... G06T 11/001; G06T 7/194; G06T 7/11; G06T 7/155; G06T 2207/10024;
(Continued)

(56) References Cited

U.S. PATENT DOCUMENTS

| 10,255,681 | B2 * | 4/2019 | Price | G06N 3/0454 |
| 10,692,221 | B2 * | 6/2020 | Pao | G06K 9/6212 |
| 2017/0344860 | A1 * | 11/2017 | Sachs | G06T 7/73 |

FOREIGN PATENT DOCUMENTS

KR    10-1624801    5/2016

OTHER PUBLICATIONS

Yunjey Choi, Minje Choi, Munyoung Kim, Jung-Woo Ha, Sunghun Kim, Jaegul Choo, IEEE Conference on Computer Vision and Pattern Recognition (CVPR), 2018, pp. 8789-8797, StarGAN: Unified Generative Adversarial Networks for Multi-Domain Image-to-Image Translation.

(Continued)

*Primary Examiner* — Antonio A Caschera
(74) *Attorney, Agent, or Firm* — Ladas & Parry, LLP (57) ABSTRACT

A deep learning-based virtual hair dyeing method is performed by an image editing server including a deep learning neural network and generative adversarial networks (GANs). The method comprises obtaining an original image and a desired hair color; generating a semantic map by providing the original image to the deep learning neural network; generating a trimap automatically with respect to the original image based on the semantic map; generating an alpha mask by performing alpha matting on the original image based on the trimap; obtaining a transformed image by applying the original image to the GANs; and obtaining a virtual dyeing image by synthesizing the original image and the obtained transformed image through the alpha mask.

15 Claims, 5 Drawing Sheets

(51) Int. Cl.
*G06T 7/11* (2017.01)
*G06T 7/155* (2017.01)
*G06N 3/04* (2006.01)
*G06N 3/08* (2006.01)
*G06T 5/30* (2006.01)

(52) U.S. Cl.
CPC .................. *G06T 5/30* (2013.01); *G06T 7/11* (2017.01); *G06T 7/155* (2017.01); *G06T 7/194* (2017.01); *G06T 2207/10024* (2013.01); *G06T 2207/20081* (2013.01); *G06T 2207/30196* (2013.01)

(58) Field of Classification Search
CPC ........... G06T 2207/20081; G06T 2207/20084; G06T 2207/30196; G06T 5/30; G06N 3/0454; G06N 3/088
See application file for complete search history.

(56) References Cited

OTHER PUBLICATIONS

Eduardo S. L. Gastall and Manuel M. Oliveira, (2010), Eurographics 2010 / T. Akenine-Moller and M. Zwicker, "Shared Sampling for Real-Time Alpha Matting".

* cited by examiner

DEEP LEARNING BASED VIRTUAL HAIR DYEING METHOD AND METHOD FOR PROVIDING VIRTUAL HAIR DYEING SERVICE USING THE SAME

CROSS REFERENCE TO RELATED APPLICATION(S)

This application claims the priority to Korean Patent Application No. 10-2018-0154223, filed on Dec. 4, 2018, which is all hereby incorporated by reference in its entirety.

BACKGROUND

Technical Field

The present disclosure generally relates to a deep learning-based virtual hair dyeing method and a system using the method. More particularly, the present disclosure relates to a method for virtually dyeing hair of a subject in an image selected by a user through a deep learning neural network.

Related Art

Due to widespread use of user terminals such as portable devices, smartphones, tablet PCs, and Personal Digital Assistants (PDAs) and advances in information processing technology, a lot of research is conducted actively on image editing techniques for capturing images or videos by using the user terminals and editing the captured images or videos according to the user's needs.

One of commercial applications based on image editing techniques is a virtual hair dyeing service that virtually dyes a subject of an image. Various algorithms for virtual hair dyeing are being developed; most of them. However, those algorithms cannot properly process typical features of a hair image such as thinness, smooth texture and bending, and color change due to the bending, which causes image quality of a virtually dyed image to be degraded.

An example of the virtual dyeing technique is described in Yunjey Choi, Minje Choi, Munyoung Kim, Jung-Woo Ha, Sunghun Kim, Jaegul Choo, IEEE Conference on Computer Vision and Pattern Recognition (CVPR), 2018, pp. 8789-8797, StarGAN: Unified Generative Adversarial Networks for Multi-Domain Image-to-Image Translation, which is all hereby incorporated herein by reference in its entirety.

However, the conventional virtual dyeing technique may cause degradation of image quality since non-hair image areas such as clothes or background of a face may be changed with the hair area of the image.

PRIOR ART REFERENCES

Patent Reference (Patent 001) Korean Patent No. 10-1624801 B1

SUMMARY

To solve the problem, the present disclosure proposes a deep learning-based virtual hair dyeing method for virtually dyeing hair of a subject in an image using a deep learning network and a system using the method.

More specifically, various embodiments of the present disclosure may provide a deep learning-based virtual hair dyeing method capable of accurately segmenting a hair area in an image without input or intervention of a user and automatically virtually dyeing the hair in the segmented hair area with an arbitrary color.

Also, some embodiments of the present disclosure can reflect change of a hair color as well as other features such as thinness and bending of the hair by performing virtual hair dyeing through a generative adversarial network.

Additionally, certain embodiments of the present disclosure may provide a deep learning-based virtual hair dyeing method capable of maintaining image quality of non-hair areas as well as a hair area to that of an original image by combining an image generated or transformed by a generative adversarial network with the original image based on a precisely segmented hair area.

A deep learning-based virtual hair dyeing method according to an embodiment of the present disclosure may be a deep learning based virtual hair dyeing method performed by a processor of an image editing server including a deep learning neural network and generative adversarial networks (GANs). The method comprising obtaining an original image and a desired hair color; outputting a semantic map by providing the original image to the deep learning neural network; generating a trimap automatically with respect to the original image based on the semantic map; obtaining an alpha mask by alpha matting the original image based on the trimap; obtaining a transformed image by applying the original image to the generative adversarial network; and obtaining a virtual dyeing image by synthesizing the original image and the transformed image through the alpha mask.

At this time, the image editing server may include a plurality of generative adversarial networks capable of transforming a hair area to have different colors, and one of the generative adversarial networks may be a neural network trained end-to-end through unsupervised learning for a first training data set comprising images of a first hair color and a second training data set comprising images of a second hair color.

Also, the outputting a semantic map may include outputting a semantic map that designates an area occupied by hair in the original image as a hair area and designates the remaining areas except for the hair as at least one or more invalid areas.

Also, the generating a trimap with respect to the original image may include generating the trimap by performing morphological transformations based on morphology by using the semantic map.

Also, the obtaining an alpha mask by alpha matting the original image may include performing alpha matting on the individual pixels of the original image based on the trimap and generating the alpha mask by adding transparency information of each individual pixel of the original image through the alpha matting.

Also, the obtaining a virtual dyeing image by synthesizing the original image and the transformed image may include alpha blending of the original image and the transformed image based on the alpha mask.

Also, the method may further include selecting a generative adversarial network that matches the original hair color in the original image and the desired hair color.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the specification, the same or corresponding constituting element is assigned the same reference number, and repeated descriptions thereof will be omitted.

Figure 1:
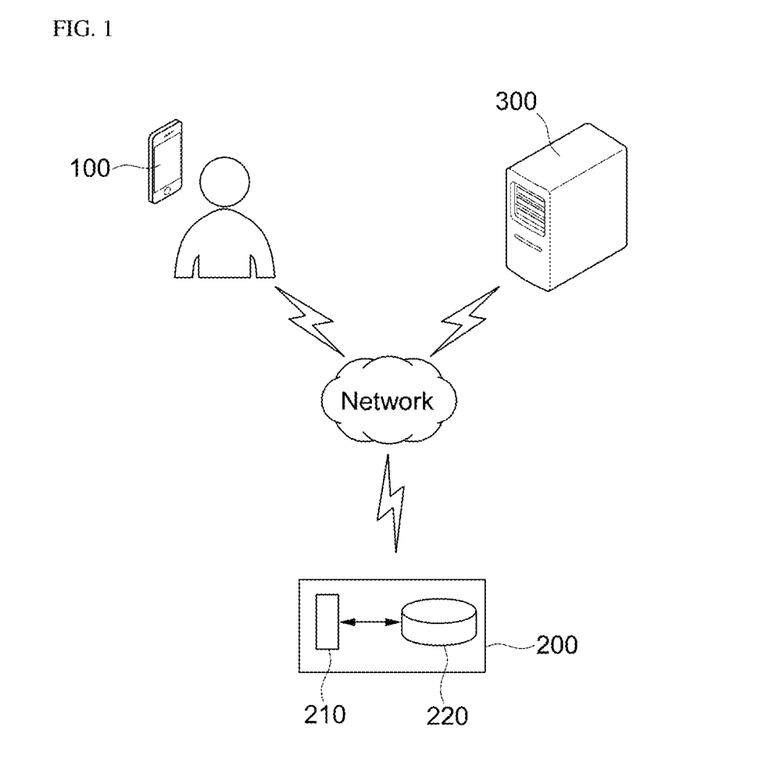
FIG. 1 illustrates a conceptual diagram of a deep learning-based virtual hair dyeing system according to an embodiment of the present disclosure.

FIG. 1 illustrates a conceptual diagram of a deep learning-based virtual hair dyeing system according to an embodiment of the present disclosure.

Referring to FIG. 1, the deep learning-based virtual hair dyeing system according to an embodiment of the present disclosure may include a terminal 100, a virtual hair dyeing service providing server 300 (in what follows, a 'service providing server 300'), and an image editing server 200.

<Terminal 100>

First, the terminal 100 is a user terminal that is configured to receive a virtual hair dyeing service, which may access the service providing server 300 through wired or wireless communication and provide a virtual hair dyeing function.

The terminal 100 is not limited to a specific type of terminal 100 as long as the terminal 100 is equipped with an application providing a virtual hair dyeing function. For instance, examples of the terminal 100 include a smart phone, mobile phone, laptop computer, digital broadcast terminal, Personal Digital Assistant (PDA), Portable Multimedia Player (PMP), navigation, tablet PC, ultrabook, wearable device, glass-type terminal 100 (smart glass), or kiosk.

The terminal 100 may include a processor processing data and a memory in which a virtual hair dyeing program is installed and stored. The processor may read out the virtual hair dyeing program stored in the memory and provide the virtual hair dyeing function to a user.

For example, after executing the virtual hair dyeing program through the terminal 100, the user may select an original image to change a hair color in the original image and input a desired color to be applied to the hair color of the original image. By transmitting the original image and the desired color selected by the user to the service providing server 300, the terminal 100 obtains, from the service providing server 300, a virtual dyeing image in which the hair color of the original image is changed from a previous hair color to the desired color, thereby providing the virtual hair dyeing function to the user.

Components of Terminal 100

Figure 2:
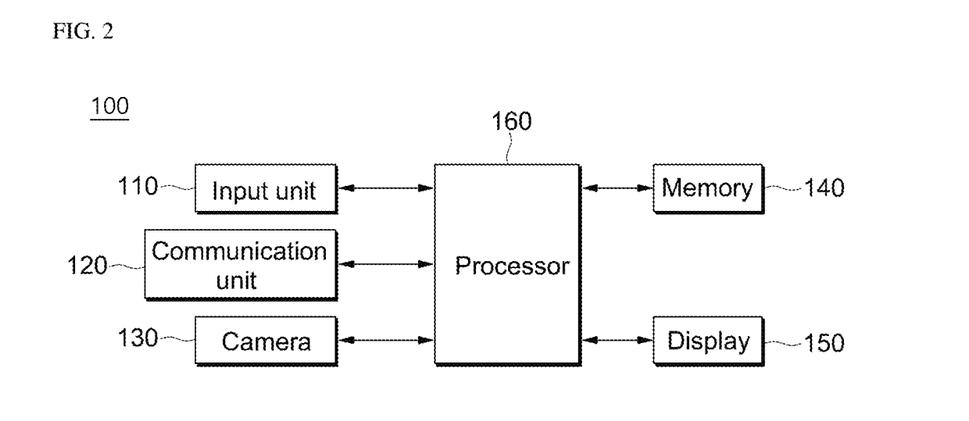
FIG. 2 is a block diagram of a user terminal for executing an application with a deep learning-based virtual hair dyeing function according to an embodiment of the present disclosure.

In what follows, exemplary components and structures of the terminal 100 will be described in detail with reference to FIG. 2.

The terminal 100 according to an embodiment of the present disclosure may comprise an input unit 110, a display 150, a communication unit 120, a memory 140, a camera 130, and a processor 160.

First, the input unit 110 included in the terminal 100 may receive or detect an input of the user.

For example, the input unit 110 may be configured to receive or detect an execution input associated with a command turning on or off power of the terminal 100 or receive or detect a configuration or execution inputs associated with various functions.

The input unit 110 may include at least one or more of a touch input unit (for example, a touch sensor, a touch key, a touch panel and a mechanical key) that senses or detects a touch input of the user and a microphone that receives or detects a voice input to detect a user input.

Also, the display 150 that is comprised in the terminal 100 displays a screen of executing the virtual hair dyeing function or an interface related to the virtual hair dyeing function. By forming a layer structure or being integrated into a single body with touch sensors, the display 150 may be implemented as a touch screen. The touch screen may not only act as the input unit 110 that provides an input interface between the terminal 100 and the user but also provide an output interface between the terminal 100 and the user.

The display 150 may include at least one from among liquid crystal display (LCD), thin film transistor-liquid crystal display (TFT LCD), organic light-emitting diode (OLED), flexible display, 3D display, e-ink display and the like.

The user may select an original image and a desired color through the touch screen to change a hair color in the original image, confirm the selected original image, and confirm a transformed, virtual dyeing image.

Also, the terminal 100 may include the communication unit 120 that communicates wirelessly with the service providing server 300.

More specifically, the terminal 100 may transmit the original image and information about the selected desired color to the service providing server 300 through the communication unit 120. The terminal 100 may receive a transformed virtual dyeing image from the service providing server 300 through the communication unit 120.

More specifically, the communication unit 120 may transmit and receive radio signals to and from at least one of a base station, an external terminal, and a server on a network constructed according to a communication scheme described below (for example, Global System for Mobile communication (GSM), Code Division Multi Access (CDMA), High Speed Downlink Packet Access (HSDPA), High Speed Uplink Packet Access (HSUPA), Long Term Evolution (LTE), or Long Term Evolution-Advanced (LTE-A)), Wireless LAN (WLAN), Wireless-Fidelity (Wi-Fi), Wireless Fidelity (Wi-Fi) Direct, Digital Living Network Alliance (DLNA), Wireless Broadband (WiBro), and World Interoperability for Microwave Access (WiMAX).

Also, the camera 130 that is included in the terminal 100 may capture an image of an object or a scene and generate image data.

More specifically, the camera 130 may include an image sensor and obtain an image of an external subject by sensing light reflected from the subject.

The image obtained through the camera 130 may be stored in the memory 140 and used as an original image afterwards.

And, the memory 140 may store a plurality of application programs or applications run in the terminal 100, and data and commands for operation of the terminal 100.

More specifically, the virtual dyeing program may be stored in the memory 140 and by being installed on the terminal 100, driven to perform the operation (or function) of the terminal 100 by the processor 160.

Also, in the case of hardware implementation, the memory 140 may be implemented by various types of storage devices such as ROM, RAM, EPROM, flash drive, and hard drive. And, the memory 140 may be implemented by a web storage that performs a storage function of the memory 140 on the Internet.

Lastly, the processor 160 comprised in the terminal 100 performs data processing for providing a service by controlling the overall operation of each unit.

The processor 160 may be implemented in various forms by using one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other logic circuits for performing functions of the terminal 100.

<Virtual Dyeing Service Providing Server 300>

Next, the service providing server 300 may virtually dye the hair of a person in an original image input or selected by the user, generate a virtual dyeing image with a transformed hair color, and provide the virtual dyeing image through the terminal 100 of the user.

The virtual dyeing service providing server 300 may include a communication module for communicating with the terminal 100, a data processing unit for processing data to provide a service, and a database that stores various types of data for providing the service.

Although the service providing server 300 may transform an original image transmitted by the user to a virtual dyeing image, the service providing server 300 may be connected to a separate server which is an image editing server to construct and execute a deep learning neural network that requires massive data processing.

<Image Editing Server 200>

The image editing server 200 may include a separate cloud server or computing device. The image editing server 200 may be configured to perform image editing by using a deep learning neural network and other algorithms, which virtually dye the hair of a person in an original image input by the user, and generate a virtual dyeing image with a change to a hair color.

Similarly, the image editing server 200 may be a neural network system installed in the data processing unit of the virtual hair dyeing service providing server 300.

In what follows, the image editing server 200 will be described with reference to an embodiment in which the image editing server 200 is implemented as a device separate from the service providing server 300, receives images from the service providing server 300, and performs deep learning on the received images.

The image editing server 200 may include a processor 210 and a memory 220. The processor 210 may be configured to process data. The memory 220 may be configured to store an image deep learning execution program for performing deep learning of images. The processor 210 reads out the image deep learning execution program and performs, according to a constructed neural network system, deep learning of images described below.

For example, the image editing server 200 may include a main processor for controlling entire units and a plurality of graphics processing units (GPUs) for processing massive computations required to drive a neural network according to the deep learning of images.

In terms of its roles, the image editing server 200 may be divided into a first image editing unit that virtually dyes the hair of a subject in an original image, a second image editing unit that extracts only the hair area from the original image to generate a mask, and a third image editing unit that synthesizes the original image and an image with virtually dyed hair through the mask.

Figure 3:
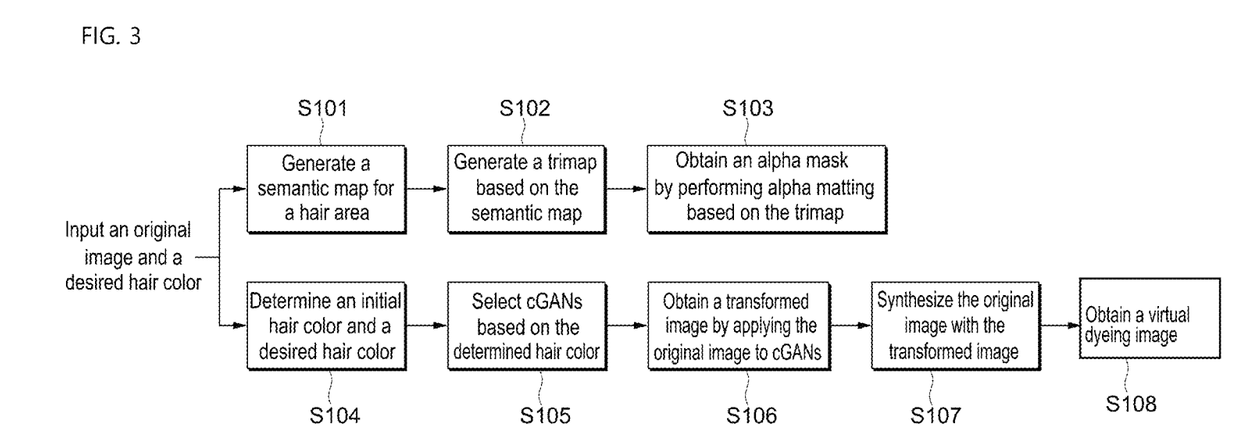
FIG. 3 is a flow diagram illustrating a deep learning-based virtual hair dyeing method according to an embodiment of the present disclosure.

FIG. 3 is a flow diagram illustrating a deep learning-based virtual hair dyeing method according to an embodiment of the present disclosure.

In what follows, a method for virtually dyeing a hair area of an original image by the image editing server 200 will be described in detail with reference to FIG. 3.

Referring to FIG. 3, the image editing server 200 may receive an original image for virtual hair dyeing and information about a desired color for hair dyeing from the service providing server 300, the terminal 100 and/or the user.

Figure 4:
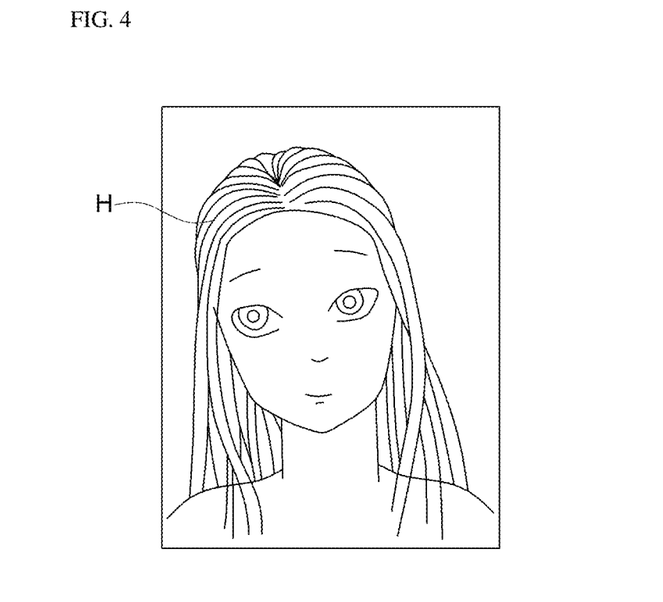
FIG. 4 illustrates an example of an original image to be transformed by deep learning-based virtual dyeing.

An example of the original image for virtual hair dyeing is shown in FIG. 4. The original image may be a portrait image that contains a person as a subject and displays at least part of hair (H) with an existing color.

The image editing server 200, which has obtained the original image, may perform image editing to generate a mask to accurately designate only the hair area in the received original image.

The image editing server 200 may generate a transformed image in which the hair color is changed or transformed to the desired color from that of the original image through a generative adversarial network (GAN).

To examine the process for generating a mask, the image editing server 200 may generate a semantic map through deep learning-based semantic segmentation of the original image (S101).

Here, the semantic map may be a map that gathers pixels having similarity, adjacency, continuity, and commonality into groups to divide an original image roughly into a plurality of areas composed of pixels having similar characteristics.

The image editing server 200 may designate a hair area from each individual area of the semantic map through a deep learning-based neural network and designate the remaining area of each individual area except for the hair area as an invalid area.

Figure 5:
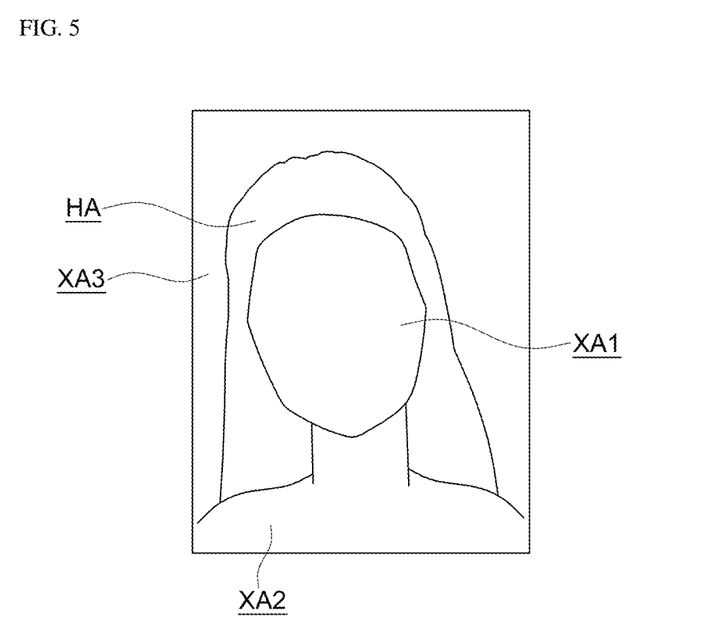
FIG. 5 illustrates an example of a semantic map obtained from an original image according to an embodiment of the present disclosure.

For example, referring to FIG. 5, a semantic map may be a map that designates a hair area HA of an original image as a valid area; a face area as a first invalid area XA1; a body area as a second invalid area XA2; and the background as a third invalid area XA3.

In other words, the image editing server 200 may input an original image to an image deep learning-based neural network and generate a semantic map that roughly divides the original image into a hair area and a plurality of the remaining invalid areas in the first place.

Next, the image editing server 200 may generate a trimap by analyzing the original image based on the semantic map (S102).

Figure 6:
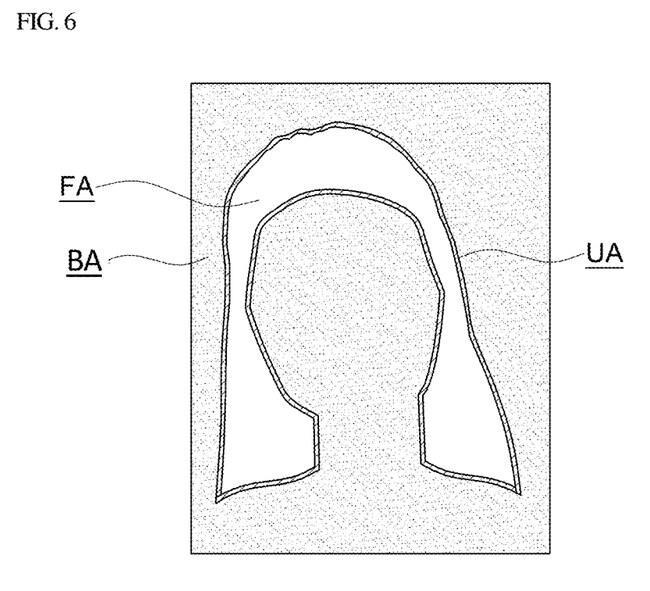
FIG. 6 illustrates an example of a trimap obtained based on a semantic map according to an embodiment of the present disclosure.

Here, referring to FIG. 6, a trimap may be a map that designates a hair area as a foreground area (FA), the remaining area other than the hair area as a background area (BA), and the area between the foreground area FA and the background area BA, which is not clear to determine whether it belongs to the hair area or not, as a boundary area (UA).

To generate the trimap, the image editing server 200 may perform morphological transformations based on morphology by using the semantic map.

For instance, the image editing server 200 may assign original image pixels belonging to the area designated as the hair area HA in the semantic map as valid pixels (for example, a numerical value of 1) and the pixels belonging to the remaining invalid area (such as the first to third invalid areas in the semantic map) as invalid pixels (for example, a numerical value of 0), and may perform image transformations that apply erosion and dilation filters to individual pixels.

More specifically, the image editing server 200 may distinguish the foreground area composed of unambiguous pixels of the hair area through erosion filtering.

For example, after defining a K (pixel)×K (pixel) kernel as an erosion filter and applying the K×K kernel to part of pixels in the original image, if at least one invalid pixel is found among pixels to which the kernel has been applied, the image editing server 200 may apply an erosion filter that defines a central pixel as an invalid pixel.

After the erosion filter is applied to the original image, the image editing server 200 may assign the area composed of valid pixels as the foreground area.

In other words, the image editing server 200 may define the foreground area as being the area consisting of only those pixels confirmed strictly as belonging to an unambiguous hair area through erosion filtering against a hair area designated roughly in the semantic map.

Also, the image editing server 200 may extract the background area composed of unambiguous pixels belonging to non-hair areas through a dilation filter.

For example, if a K (pixel)×K (pixel) kernel is used as a dilation filter, and at least one valid pixel is found among pixels to which the K×K kernel has been applied, the image editing server 200 may apply a dilation filter that defines a central pixel as a valid pixel.

After the original image passes through the dilation filter, the image editing server 200 may assign the area composed of invalid pixels as the background area.

In other words, the image editing server 200 may define the background area as being the area consisting of only those pixels confirmed strictly as belonging to an unambiguous invalid area through dilation filtering against an invalid area designated roughly in the semantic map.

Also, the image editing server 200 may distinguish a boundary area, which is not clear to determine whether it belong to the hair area or not, through the erosion and dilation filters.

More specifically, the image editing server 200 may define a boundary area as the remaining area except for the area assigned as the foreground area and the area assigned as the background area.

In other words, the image editing server 200 may designate the boundary area as the remaining area of a valid area that has passed the dilation filter excluding the portion of the valid area that has passed the erosion filter.

Through the process described above, the image editing server 200 may automatically generate a trimap based on deep learning without receiving or involving a separate user selection on the foreground, background, and boundary areas.

Next, the image editing server 200 may calculate transparency (a) of each pixel of the original image by applying alpha matting to the original image based on the trimap (S103).

Here, the transparency of the pixel may be an index representing whether the corresponding pixel belongs or corresponds to hair. For instance, in case the transparency of the pixel is 1, it indicates that the corresponding pixel is a valid pixel and represents hair while, in case the transparency of the pixel is 0, it indicates that the corresponding pixel is an invalid pixel and belongs to a non-hair area. If the transparency of the pixel is less than 1 and larger than 0, the corresponding pixel is more likely to belong to a hair area as the transparency becomes closer to 1.

Also, the transparency may be used to represent whether to apply a pixel of the original image or a pixel of a transformed image to an area occupied by the corresponding pixel. In other words, when the original image and its transformed image are later to be synthesized based on the transparency, characteristics of both of the original and transformed images may be reflected by applying the transparency to the boundary between an area to which the original image is applied and an area to which the transformed image is applied so that the original and transformed images are synthesized seamlessly across the boundary.

In other words, the image editing server 200 may distinguish valid pixels that unambiguously represent a hair area from invalid pixels that unambiguously represent a non-hair area in the boundary area through alpha matting, and calculate the probability of whether ambiguous pixels belong to a valid area in terms of transparency.

In order for the image editing server 200 to perform alpha matting, the user may need to designate the foreground area, and background and boundary areas having different characteristics. For this purpose, the image editing server 200 may utilize a pre-created trimap.

In other words, the image editing server 200 may generate a trimap through deep learning without receiving or involving a separate designation by the user, thereby minimizing user inconvenience.

The image editing server 200 may analyze pixels of the foreground and background areas distinguished from each other in the trimap to obtain characteristic information (for example, color (RGB) and coordinates) of pixels within the foreground area and characteristic information (for example, color (RGB) and coordinates) of pixels within the background area.

And, the image editing server 200 may compare the characteristic information of pixels belonging to the foreground area and the characteristic information of pixels belonging to the background area with the characteristic information of pixels within the boundary area, and calculate transparencies of pixels in the boundary area based on whether the corresponding pixel is close to the characteristics of the foreground area or background area.

More specifically, if characteristics of pixels in the boundary area correspond or belong to the characteristics of pixels in the foreground area, the image editing server 200 assigns or calculates the transparency of the corresponding pixel as 1 and labels or designates the corresponding pixel as a valid hair pixel. Here, the belonging to characteristic information of a pixel may indicate that when a characteristic of a foreground area pixel is converted to a histogram, the pixel corresponds to one of characteristic of the histogram.

On the other hand, in case characteristics of a pixel in the boundary area belong to the characteristic information of a background area pixel, the image editing server 200 may calculate the transparency of the corresponding pixel as 0 and designate the corresponding pixel as an invalid pixel.

Also, in case characteristics of a pixel in the boundary area exhibit both of the characteristic of the background area and the characteristic of the foreground area, the image editing server 200 may calculate the ratios of the pixel's belonging to the characteristic information of the background and foreground areas, respectively, and calculate the transparency in terms of a probability value ranging from 0 to 1.

More specifically, a detailed description about an algorithm for alpha matting may be found in a related paper (Eduardo S. L. Gastal1 and Manuel M. Oliveira, (2010), EUROGRAPHICS 2010/T. Akenine-MÖoller and M. Zwicker, "Shared Sampling for Real-Time Alpha Matting").

The image editing server 200 according to an embodiment of the present disclosure may perform alpha matting by applying an algorithm that replaces the Tiramisu network in the paper above with a backbone network.

Next, the image editing server 200 may obtain an alpha mask that designates, based on the transparency, only the pixels representing hair in the original image as valid pixels.

Figure 7:
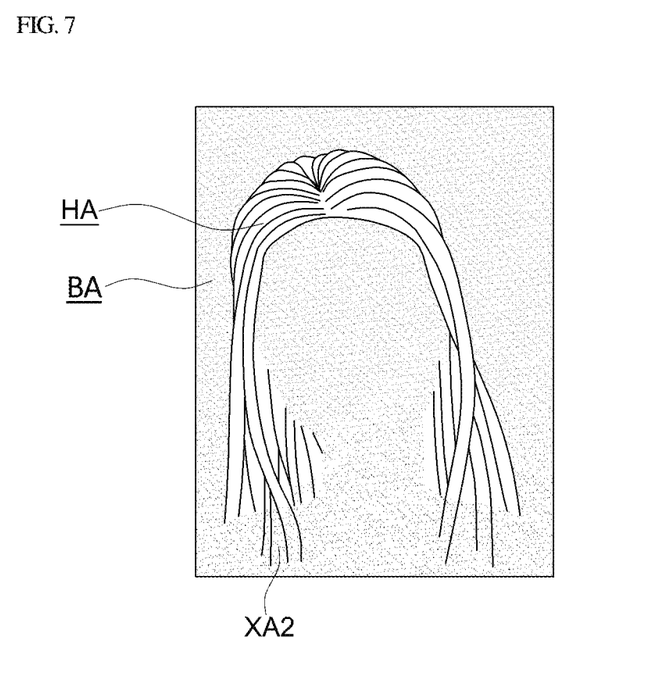
FIG. 7 illustrates an example of an alpha mask that treats a hair area of an original image as a foreground according to an embodiment of the present disclosure.

More specifically, the alpha mask may be composed of valid pixels representing hair, invalid pixels representing the background area, and boundary pixels where transparency is used to express the probability that the corresponding pixel belongs to a hair area.

In another aspect, referring again to FIG. 7, the alpha mask may designate pixels in the original image with a transparency value of 1 as valid pixels, pixels with a transparency value of 0 as invalid pixels, and pixels with a transparency value ranging from 0 to 1 as boundary pixels, and may include transparency information into each pixel.

The alpha mask may be used later for synthesizing the original image and a transformed image generated through a generative adversarial network.

In other words, if every pixel is completely distinguished either as the foreground or the background, edges of the foreground area in a synthesized image stand out as if cut out by a knife. Therefore, an ambiguous portion of the edges may be calculated to have a grey color between white and black colors so that the cut-out foreground area is naturally melt into a new background. In particular, in the case of human hair, it is very effective to calculate the hair as a grey area. As the grey color becomes darker, a corresponding transformed image more vividly stands out while, and as the grey color becomes lighter, the original image is reflected or revealed more.

To describe the process for generating a transformed image through a generative adversarial network, the image editing server 200 may first check the original hair color of a person who is a subject of an original image and determine a desired color to which the user wants to change the hair color or which the user selects or inputs (S104).

More specifically, the image editing server 200 may confirm the original hair color through characteristic information defined by pixels of the hair area during a process for obtaining the alpha mask.

Also, the image editing server 200 may determine a desired hair color according to the user's selection.

Next, the image editing server 200 may select generative adversarial networks (GANs) for which the original hair color and the desired hair color are chosen as an input and an output, respectively (S105).

More specifically, the image editing server 200 may train the network through end-to-end unsupervised learning by using images with a first hair color as a first training data set and images with a second hair color as a second training data set.

For instance, the generative adversarial networks may use cGANs suitable for analyzing characteristics of hair and transforming a hair color.

Examples of details of the network used in the present disclosure may also be found in the cGANs described in the paper by Jun-Yan Zhu, Taesung Park, Phillip Isola Alexei A, titled "Unpaired Image-to-Image Translation using Cycle-Consistent Adversarial Networks", which is all hereby incorporated herein by reference in its entirety.

As described above, when the training is completed, the generative adversarial network becomes capable of transforming between the first hair color and the second hair color. Thus, if an image of a person with the first hair color is received, a transformed image in which the hair color of the person is changed to the second hair color may be obtained.

The image editing server 200 may include a plurality of generative adversarial networks that transform a hair color to different colors according to hair color pairs. Thus, a generative adversarial network suitable for a pair of an original hair color and a desired hair color is selected to obtain a transformed image in which the original hair color is transformed into the desired hair color (S106).

However, although the transformed image obtained from the generative adversarial network realizes a natural transformation of a hair color by reflecting hair characteristics, the transformed image may give a sense of difference as the color of the remaining area such as the face or background is also changed along with the hair color.

To prevent this effect, the image editing server 200 may synthesize an original image and a transformed image based on the alpha mask (S107).

More specifically, the image editing server 200 may use the alpha mask so that pixels of the transformed image are applied for valid pixels and pixels of the original image are used for invalid pixels.

And, the image editing server 200 may take into account the pixel transparency so that pixels that reflect both of the characteristics of valid and invalid pixels of the original image are used for the boundary pixels.

In other words, the image editing server 200 may prevent degradation of image quality in the areas other than the hair area by using virtually dyed pixels of a transformed image for pixels representing hair and using pixels of the original image for pixels representing the background.

Also, the image editing server 200 may naturally connect the boundary between the transformed image and the original image by reflecting both of the characteristics of the pixels of the transformed and original images according to their transparencies for boundary pixels.

The image editing server 200 may utilize an alpha-blending technique as a method for editing a synthesized image through the alpha mask.

For example, the image editing server 200 may apply the alpha blending technique for the original and transformed images that consist of 24-bit color pixels for representing conventional RGB colors, each color of which uses 8 bits for each pixel. When the transformed image is overlaid on or over the original image across the boundary area, to give an effect of making the transformed image look transparent over the original image, the alpha blending technique combines a background RGB color with RGB color components to be displayed over the background RGB color and displays the combined color value by adding transparency to the 8-bits of each color to allocate a new color value for each pixel.

More specifically, the image editing server 200 may combine two pixels of original and transformed images by lowering brightness of a pixel in the original image in proportion to the transparency of a boundary pixel and lowering brightness of a pixel in the transformed image in inverse proportion to the transparency of the boundary pixel.

Since the original and transformed images are combined as described above, the boundary area is smoothly connected, by which the original and transformed image are synthesized in a natural manner.

At this time, the pixels for which a transformed image is applied are the virtually dyed pixels transformed naturally through a generative adversarial network, which gives or provides a natural, virtual dyeing effect by reflecting characteristics of hair.

Also, the pixels for which the original image is applied correspond to the remaining areas other than the hair and provide an advantage that the image quality of a background is kept the same as the original image by applying the original image as it is.

The image editing server 200 may transmit a virtual dyeing image, which is generated by synthesizing an original image and a transformed image, to the user or the terminal 100 directly or through the service providing server 300 (S108).

Figure 8:
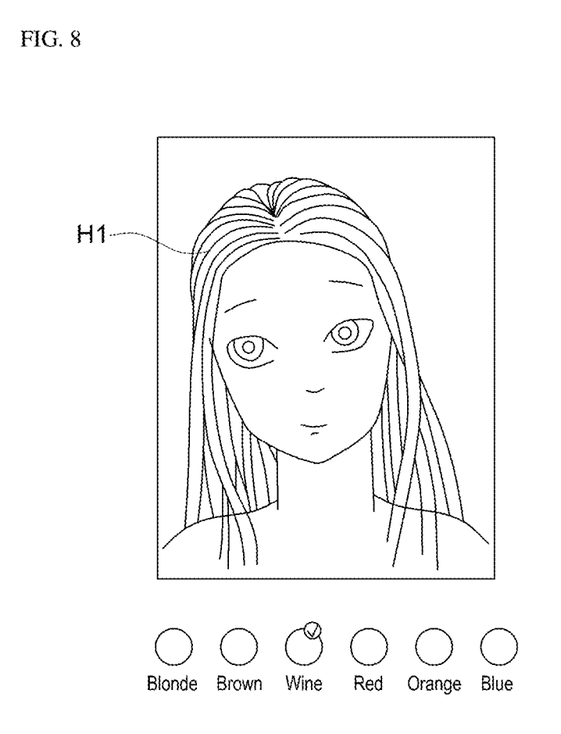
FIG. 8 illustrates a example of a virtual dyeing image and an interface according to an embodiment of the present disclosure.

Referring to FIG. 8, a virtual dyeing service for displaying a virtual dyeing image that naturally changes only the hair color H1 may be received if a user provides an original image for virtual dyeing and a desired color selected among a plurality of colors.

A deep learning-based virtual hair dyeing method or system according to some embodiments of the present disclosure may provide a virtual dyeing service for displaying a virtual dyeing image that naturally changes a hair color of an original image provided by a user for virtual dyeing based on a desired color selected by the user among a plurality of colors.

Certain embodiments of a deep learning-based virtual hair dyeing method or system may minimize user inconvenience since an alpha mask that designates a hair area may be generated without a user input.

Also, some embodiments of a deep learning-based virtual hair dyeing method or system may provide a virtual dyeing effect that reflects morphological features of hair by obtaining an image the hair area of which has been transformed into a desired hair color through a generative adversarial network.

Additionally, according to certain embodiments of the present disclosure, a deep learning-based virtual hair dyeing method or system may naturally synthesize the original image and a transformed image through the alpha mask and minimize image degradation of a background image.

The embodiments of the present disclosure may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and composed specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be composed to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this specification but has to be defined by the appended claims.

What is claimed is:

1. A method for virtually dyeing hair in an image using deep learning, the method comprising:
   receiving an original image and a desired hair color;
   inputting the original image to a deep learning neural network and generating, by the deep learning neural network, a semantic map of the original image;

generating a trimap of the original image based on the semantic map generated by the deep learning neural network;

generating an alpha mask corresponding to the original image by performing alpha matting on the original image based on the generated trimap;

generating, by generative adversarial networks (GANs), a transformed image that a hair color in the original image is changed to the desired hair color by the GANs;

generating a virtual dyeing image by synthesizing the original image and the transformed image generated by the GANs through the generated alpha mask; and outputting the generated virtual dyeing image, wherein the method is performed by a processor of an image editing server including the deep learning neural network and the GANs.

2. The method of claim 1, wherein the GANs change a hair area of the original image to have different colors, respectively.

3. The method of claim 2, wherein one of the GANs is a neural network trained end-to-end through unsupervised learning for a first training data set comprising images of a first hair color and a second training data set comprising images of a second hair color.

4. The method of claim 1, wherein, in the semantic map, an area of the original image including hair is designated as a hair area and a remaining area of the original image not including the hair is designated as an invalid area.

5. The method of claim 4, wherein the semantic map designates the hair area of the original image as a valid area, a face area of the original image as a first invalid area, a body area of the original image as a second invalid area, and a background of the original image as a third invalid area.

6. The method of claim 5, wherein the generating the trimap of the original image includes performing morphological transformations based on morphology by using the semantic map to generate the trimap.

7. The method of claim 6, wherein the generating the trimap of the original image includes classifying pixels of the original image located within the valid area of the semantic map as valid pixels, classifying pixels of the original image located in the first to the third invalid areas of the semantic map as invalid pixels, and applying an erosion filter and a dilation filter to pixels of the original image.

8. The method of claim 7, wherein the generating the trimap of the original image further comprises separating pixels classified, by the erosion filter, into a foreground area composed of pixels located in the hair area.

9. The method of claim 8, wherein the generating the trimap of the original image further comprises separating pixels classified, by the dilation filter, into a background area composed of pixels located in the invalid area.

10. The method of claim 9, wherein the generating the trimap of the original image further comprises separating a remaining area, not classified as the foreground area and the background area, into a boundary area.

11. The method of claim 6, wherein the generating the alpha mask includes performing the alpha matting on individual pixels of the original image based on the trimap.

12. The method of claim 11, wherein the generating the alpha mask includes generating the alpha mask by assigning transparency degrees to each individual pixel of the original image through the alpha matting.

13. The method of claim 12, wherein the generating the virtual dyeing image by synthesizing the original image and the transformed image includes alpha blending of the original image and the transformed image based on the alpha mask.

14. The method of claim 13, further comprising selecting one of the generative adversarial networks that matches an original hair color in the original image and the desired hair color.

15. A method for providing a virtual hair dyeing service by using the method of claim 1, the method for providing the virtual hair dyeing service performed by a processor of a terminal, comprising:

receiving from the image editing server the virtual dyeing image generated by the method for virtually dying the hair in the original image using the deep learning according to claim 1, wherein the original image is captured by a camera of the terminal and the desired hair color is received from the terminal; and outputting the received virtual dyeing image.

* * * * *